(12) United States Patent
Kim et al.

(10) Patent No.: US 12,237,480 B2
(45) Date of Patent: Feb. 25, 2025

(54) BATTERY CELL EVALUATION METHOD AND BATTERY CELL EVALUATION DEVICE

(71) Applicant: LG Energy Solution, Ltd., Seoul (KR)

(72) Inventors: Na Yoon Kim, Daejeon (KR); Yong Su Choi, Daejeon (KR); Hyungkyun Yu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 357 days.

(21) Appl. No.: 17/914,070

(22) PCT Filed: Oct. 22, 2021

(86) PCT No.: PCT/KR2021/014940
§ 371 (c)(1),
(2) Date: Sep. 23, 2022

(87) PCT Pub. No.: WO2022/108142
PCT Pub. Date: May 27, 2022

(65) Prior Publication Data
US 2023/0155191 A1    May 18, 2023

(30) Foreign Application Priority Data

Nov. 23, 2020 (KR) .................. 10-2020-0157741
Oct. 18, 2021 (KR) .................. 10-2021-0138338

(51) Int. Cl.
*H01M 10/48* (2006.01)
*H01M 10/04* (2006.01)
*H01M 10/42* (2006.01)

(52) U.S. Cl.
CPC ......... *H01M 10/48* (2013.01); *H01M 10/049* (2013.01); *H01M 10/4285* (2013.01)

(58) Field of Classification Search
CPC .. H01M 10/049; H01M 10/052; H01M 10/42; H01M 10/48; H01M 10/0404;
(Continued)

(56) References Cited

U.S. PATENT DOCUMENTS 10,535,846 B2 * 1/2020 Kim ................... H01M 50/119
12,107,279 B2 * 10/2024 Hwang ................ C23C 28/023
(Continued)

FOREIGN PATENT DOCUMENTS

JP  2007134191 A  5/2007
JP  2012064508 A  3/2012
(Continued)

OTHER PUBLICATIONS

International Search Report for Application No. PCT/KR2021/014940 mailed Feb. 4, 2022, pp. 1-3.

*Primary Examiner* — An H Do
(74) *Attorney, Agent, or Firm* — Lerner David LLP (57) ABSTRACT

A battery cell evaluation method is provided. The method includes molding a pouch film to form a receiving part to which an electrode assembly is mounted, providing an impact to at least one of corners of the receiving part, storing the pouch film inside a second container together with a first container configured to contain an electrolytic solution, and detecting presence or absence of peeling of an outer layer of the pouch film.

20 Claims, 7 Drawing Sheets

(58) Field of Classification Search
CPC ........... H01M 10/4285; H01M 50/105; H01M 2220/30; Y02P 70/50; Y02E 60/10
See application file for complete search history.

(56) References Cited

U.S. PATENT DOCUMENTS

| | | |
|---|---|---|
| 2010/0248014 A1 | 9/2010 | Huang et al. |
| 2014/0154554 A1* | 6/2014 | Kim .................... H01M 50/463 |
| | | 429/149 |
| 2015/0017518 A1 | 1/2015 | Taniguchi |
| 2020/0044203 A1 | 2/2020 | Hwang et al. |

FOREIGN PATENT DOCUMENTS

| | | |
|---|---|---|
| JP | 2013157193 A | 8/2013 |
| JP | 2016225321 A | 12/2016 |
| KR | 20090028661 A | 3/2009 |
| KR | 20130054841 A | 5/2013 |
| KR | 101487496 B1 | 1/2015 |
| KR | 20150026534 A | 3/2015 |
| KR | 20160098774 A | 8/2016 |
| KR | 20160100604 A | 8/2016 |
| KR | 101756153 B1 | 7/2017 |
| KR | 20190086105 A | 7/2019 |

\* cited by examiner

BATTERY CELL EVALUATION METHOD AND BATTERY CELL EVALUATION DEVICE

CROSS CITATION WITH RELATED APPLICATION(S)

This application is a national stage entry under 35 U.S.C. § 371 of International Application No. PCT/KR2021/014940 filed on Oct. 22, 2021, which claims priority from Korean Patent Application No. 10-2020-0157741 filed on Nov. 23, 2020 and Korean Patent Application No. 10-2021-0138338 filed on Oct. 18, 2021, the disclosures of which are incorporated herein by reference in their entirety.

TECHNICAL FIELD

The present disclosure relates to a battery cell evaluation method and a battery cell evaluation device, and more particularly to a battery cell evaluation method and a battery cell evaluation device, which is improved in accuracy of the presence or absence of peeling of the outer layer of the pouch film.

BACKGROUND

Along with the technology development and increased demand for mobile devices, demand for secondary batteries as energy sources has been rapidly increasing. Among these secondary batteries, a lithium secondary battery having high energy density and a high voltage, a long cycle lifespan, and a low self-discharge rate is commercially available and widely used.

A pouch for secondary battery is mainly used as an exterior material for packaging such a secondary battery, and the pouch is generally a pouch film made from a structure of an outer layer, an adhesive layer, an aluminum layer, an adhesive layer, and an inner layer. However, the pouch type secondary battery may be damaged in various processes. As an example, in the process of mounting the electrode assembly in the pouch, damage such as cracks may occur in the inner layer of the pouch, whereby the aluminum layer may be exposed in the pouch film. In this case, the aluminum layer may be exposed and corroded to the electrolytic solution in the pouch, which causes a problem that a corrosive gas is generated.

Figure 1:
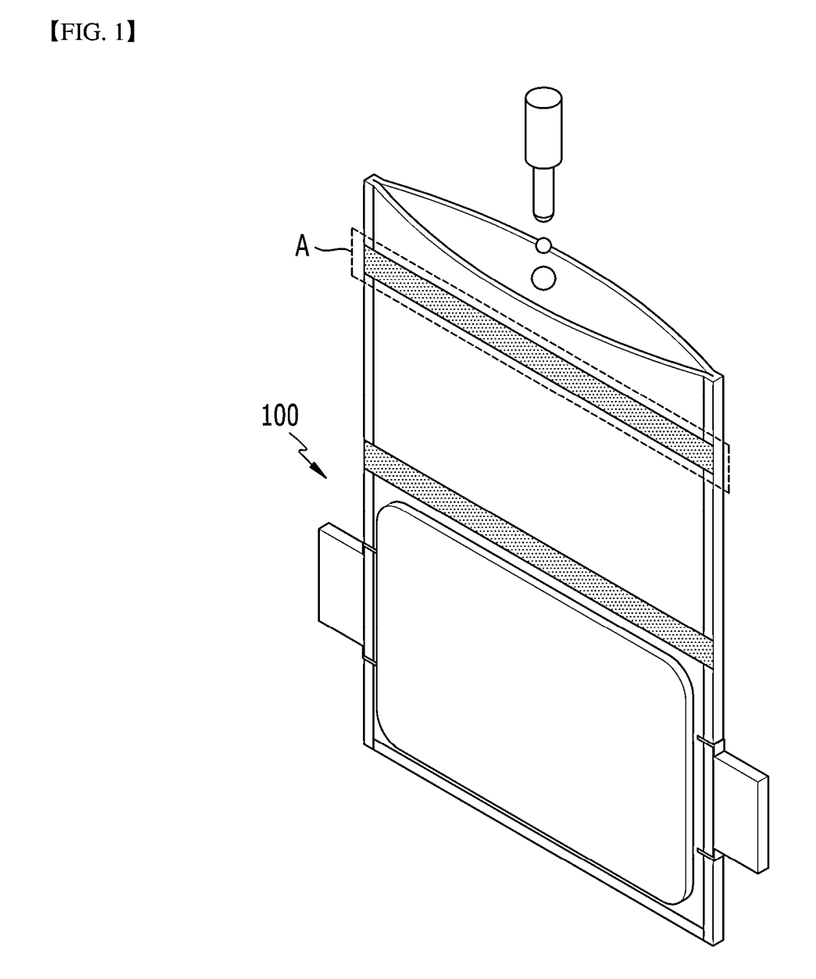
FIG. 1 is a diagram showing an electrolytic solution injection process during the battery cell manufacturing process.
Figure 2:
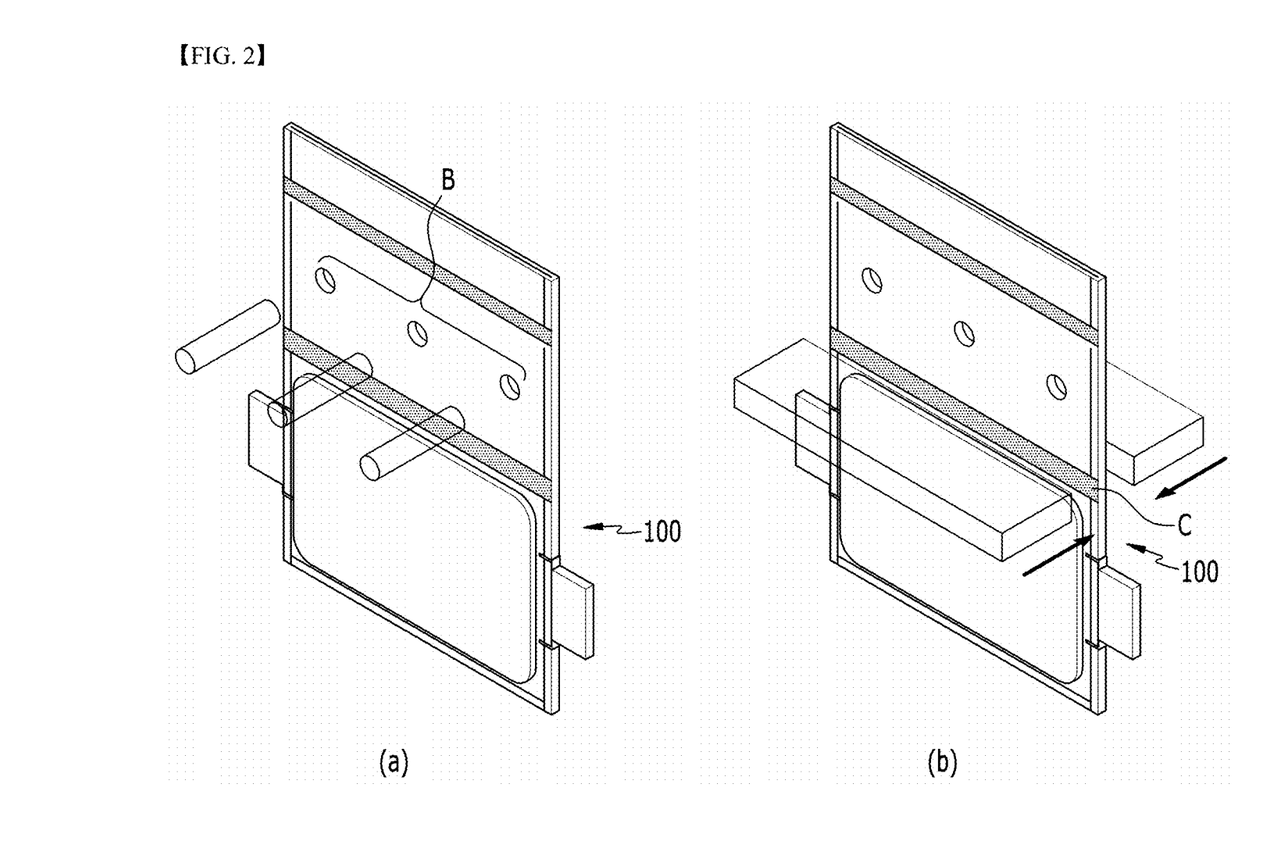
FIG. 2 is a diagram showing a degassing and resealing process after the electrolytic solution injection process of FIG. 1.

FIG. 1 is a diagram showing an electrolytic solution injection process during the battery cell manufacturing process. FIG. 2 is a diagram showing a degassing and resealing process after the electrolytic solution injection process of FIG. 1.

Referring to FIG. 1, in the process of manufacturing a battery cell, an electrolytic solution injection process is performed in which the electrolytic solution is injected in the state in which the electrode assembly is mounted in a receiving part of the pouch 100, and then a gas sealing part A is formed at one end of the pouch 100. Then, referring to FIG. 2, after the electrolytic solution process, a degassing process is performed in which a hole B is formed on one surface of the pouch to remove gas generated in the pouch, and then a resealing process is performed to form a sealing part C on the pouch film.

Here, during the degassing process as shown in FIG. 2, a hole B is formed after the inside of the pouch is made into a vacuum state, so that an impact can be provided to the corners of the receiving part formed in the pouch. Thereby, in the degassing process and the resealing process, there is a problem that a peeling phenomenon occurs because the outer layer of the pouch adjacent to the corner of the receiving part is in direct contact with the electrolytic solution or is exposed to the electrolytic solution atmosphere.

However, in the case of a conventional battery cell evaluation method, the pouch film is impregnated into a container containing an electrolytic solution to evaluate the electrolytic solution resistance, whereby it is possible to evaluate the case where the electrolytic solution directly touches the pouch film, but it is difficult to accurately evaluate the presence or absence of peeling of the pouch outer layer that occurs during the progress of the above-mentioned process. Therefore, there is a need to develop a battery cell evaluation method with improved accuracy in consideration of the situation occurring in the process of manufacturing the battery cell.

DETAILED DESCRIPTION OF THE INVENTION

Technical Problem

It is an object of the present disclosure to provide a battery cell evaluation method and a battery cell evaluation device, which is improved in accuracy of the presence or absence of peeling of the outer layer of the pouch film.

The objects of the present disclosure are not limited to the aforementioned objects, and other objects which are not described herein should be clearly understood by those skilled in the art from the following detailed description and the accompanying drawings.

Technical Solution

According to an aspect of the present disclosure, there is provided a battery cell evaluation method comprising the steps of: molding a pouch film to form a receiving part in which an electrode assembly is mounted; providing an impact to at least one of the corners of the receiving part; storing the pouch film inside a second container together with a first container containing an electrolytic solution; and detecting the presence or absence of peeling of the outer layer of the pouch film.

The first container may be opened toward the second container, and the second container may be sealed to be isolated from outside air.

At least a part of the electrolytic solution may be evaporated inside the second container.

The battery cell evaluation method may further include a step of storing the second container in a chamber maintained under a high temperature and high humidity condition.

The inside of the chamber may be maintained at a temperature of 40 to 80 degrees Celsius.

The inside of the chamber may be maintained at a humidity of 70% RH to 99% RH.

The second container may be stored in the chamber for 1 to 28 days.

The first container may contain a solution in which water is mixed together with the electrolytic solution.

The second container may be stored in the chamber for 5 to 12 hours.

The step of providing an impact to the receiving part further comprises a step in which a jig unit recessed in a shape similar to the receiving part is mounted to the receiving part, and an impact is provided to the receiving part via the jig unit.

The jig unit may provide an impact to the receiving part at a speed of 40 mm/min to 60 mm/min and a force of 0.5 N to 1.5 N for a time period of 0.1 to 1 minute.

According to another aspect of the present disclosure, there is provided a battery cell evaluation device comprising: a jig unit for providing an impact to at least one of the corners of a receiving part, formed by molding a pouch film, in which the electrode assembly is mounted; a storage unit for storing the pouch film subjected to impact from the jig unit in a second container together with the first container containing an electrolytic solution; and a detection unit that determines the presence or absence of peeling of the outer layer of the pouch film.

The jig unit may include a body part and a recessed part that can house the receiving part, and the recessed part may be recessed toward the bottom surface with reference to the outer surface of the body part.

The recessed part may have a size equal to or larger than that of the receiving part.

The recessed part may have a size equal to or larger than that of the receiving part.

A notched part may be formed at each corner of the recessed part.

The notched part may be formed in a circular shape.

The jig unit may provide an impact to the receiving part at a speed of 40 mm/min to 60 mm/min and a force of 0.5 N to 1.5 N for a time period of 0.1 to 1 minute.

The storage unit may further include a chamber maintained under a high temperature and high humidity condition, and the second container may be stored in the chamber.

The inside of the chamber may be maintained at a temperature of 40 to 80 degrees Celsius.

The inside of the chamber may be maintained at a humidity of 70% RH to 99% RH.

Advantageous Effects

A battery cell evaluation method and a battery cell evaluation device according to embodiments of the present disclosure can be improved in accuracy of the presence or absence of peeling of the outer layer of the pouch film by storing the pouch film in the electrolytic solution atmosphere.

The effects of the present disclosure are not limited to the effects mentioned above and additional other effects not described above will be clearly understood from the detailed description and the appended drawings by those skilled in the art.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Figure 3:
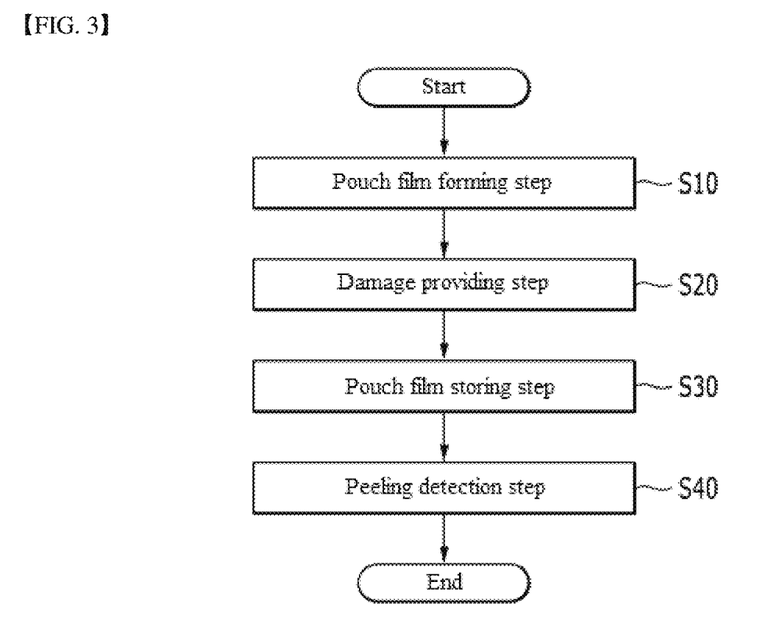
FIG. 3 is a flowchart showing a battery cell evaluation method according to an embodiment of the present disclosure.

FIG. 3 is a flowchart showing a battery cell evaluation method according to an embodiment of the present disclosure.

Referring to FIG. 3, the battery cell evaluation method according to an embodiment of the present disclosure includes a pouch film forming step (S10), a damage providing step (S20), a pouch film storing step (S30), and a peeling detection step (S40).

The pouch film forming step (S10) may be a step of molding the pouch film in order to form a receiving part to which the electrode assembly is mounted. The pouch film forming step (S10) may include a step of molding the pouch film to a depth corresponding to the limit molding depth of the pouch film. Here, the pouch film may be molded by directly contacting with a mold such as a punch. However, when several types of pouch films need to be compared and evaluated, it is preferable to mold all of them to the same depth based on the pouch having the lowest limit molding depth.

The damage providing step (S20) may be a step of providing an impact to at least one of the corners of the receiving part formed in the pouch film forming step (S10). More specifically, the damage providing step (S20) may be a step in which a jig unit recessed in a shape similar to the receiving part is mounted to the receiving part, and then an impact is provided to the receiving part via the jig unit. As an example, the jig unit can be controlled so as to provide an impact to the receiving part at a speed of 40 mm/min to 60 mm/min and a force of 0.5N to 1.5N for a time period of 0.1 to 1 minute.

Thereby, the battery cell evaluation method according to the present embodiment can simulate a situation in which an impact is provided to the receiving part in advance and the impact is provided to the corner of the receiving part of the pouch in the degassing process, and can be improved in the accuracy of evaluation regarding the presence or absence of peeling of the pouch film generated in the process of manufacturing the battery cell.

The pouch film storing step (S30) may be a step of storing the pouch film of the damage providing step (S20) in the second container together with the first container containing the electrolytic solution.

Here, the first container is opened toward the second container, and the second container may be sealed to be isolated from outside air. Further, at least a part of the electrolytic solution contained in the first container may be evaporated inside the second container. Thereby, the electrolyte vapor generated by evaporation of the electrolyte contained in the first container may be diffused inside the second container. That is, the pouch film contained in the second container may be exposed to electrolyte vapor.

Further, the pouch film storing step (S30) may further include the step of storing the second container in a chamber maintained under a high temperature and high humidity condition.

The inside of the chamber may be maintained at a temperature of 40 degrees Celsius to 80 degrees Celsius. Specifically, the inside of the chamber may be maintained at a temperature of 50 to 50 degrees Celsius. As an example, the inside of the chamber may be maintained at a temperature of 55 degrees Celsius to 65 degrees Celsius.

Thereby, the inside of the chamber can be maintained at a temperature in the above-mentioned range, and thus a chemical reaction may occur in the pouch film exposed to the electrolyte vapor, so that the accuracy of evaluation of the presence or absence of peeling of the pouch film can be improved. On the other hand, when the inside of the chamber is maintained at a temperature of less than 40 degrees Celsius, a chemical reaction is hard to occur between the pouch film and the electrolyte vapor, which causes a problem that it is difficult to accurately evaluate the presence or absence of peeling of the pouch film. Further, when the inside of the chamber is maintained at a temperature of more than 80 degrees Celsius, the temperature is too high and thus the electrolytic solution can evaporate quickly, which causes a problem that it is difficult to accurately perform the evaluation of the presence or absence of peeling of the pouch film.

The inside of the chamber may be maintained at a humidity of 70% RH to 99% RH. More specifically, the inside of the chamber may be maintained at a humidity of 75% RH to 95% RH. As an example, the inside of the chamber may be maintained at a humidity of 80% RH to 90% RH.

Thereby, the inside of the chamber can be maintained at the humidity in the above-mentioned range, and thus a chemical reaction or the like may occur in the pouch film exposed to the electrolyte vapor, so that the accuracy of evaluation of the presence or absence of peeling of the pouch film can be improved. On the other hand, when the inside of the chamber is maintained at a humidity of less than 70% RH, a chemical reaction is hard to occur between the pouch film and the electrolyte vapor, which causes a problem that it is difficult to accurately perform the evaluation of the presence or absence of peeling of the pouch film. In addition, when the inside of the chamber is maintained at a humidity of more than 99% RH, there is a problem that the amount of water consumed in the chamber increases, which causes a problem that it is difficult to proceed with the experiment.

The second container may be stored in the chamber for 1 to 28 days. More specifically, the second container may be stored in the chamber for 3 to 21 days. As an example, the second container may be stored in the chamber for 5 to 16 days.

Thereby, the second container can be stored in the chamber for the period described above, and thus, a chemical reaction or the like may be sufficiently generated in the pouch film exposed to the electrolyte vapor, so that the accuracy of evaluation of the presence or absence of peeling of the pouch film can be improved. On the other hand, when the second container is stored in the chamber for less than one day, a chemical reaction is hard to occur sufficiently between the pouch film and the electrolyte vapor, which causes a problem that it is difficult to accurately perform the evaluation of the presence or absence of peeling of the pouch film.

The peeling detection step (S40) may be a step of detecting whether the outer layer of the pouch film stored in the pouch film storage step (S30) is peeled. Here, the presence or absence of peeling of the outer layer of the pouch film can be detected with the naked eye. Here, the presence or absence of peeling of the outer layer may be evaluated based on the edges and corners of the receiving part of the pouch film. As an example, the presence or absence of peeling of the outer layer may be the case where the outer layer film of the pouch film is separated, cracks are generated, or a space is observed between the aluminum in the pouch film.

In the battery cell evaluation method according to another embodiment of the present disclosure, in the pouch film storing step (S30), the first container may contain a solution in which water is mixed together with the electrolytic solution. As an example, the first container may contain a solution in which 100 ml of electrolytic solution and 1000 ppm of $H_2O$ are mixed.

The electrolytic solution used in the present disclosure may include organic liquid electrolytes, inorganic liquid electrolytes, solid polymer electrolytes, gel type polymer electrolytes, solid inorganic electrolytes, molten inorganic electrolytes, and the like, which can be used in the manufacture of lithium secondary batteries, but the present disclosure is not limited thereto.

Specifically, the electrolytic solution may include an organic solvent and a lithium salt. The organic solvent may be used without particular limitation as long as it can function as a medium in which ions involved in the electrochemical reaction of the battery can move. The lithium salt may be used without particular limitation as long as it is a compound capable of providing lithium ions used in a lithium secondary battery.

In one example, when the electrolytic solution contains fluorine such as $LiPF_6$, it may react with water and oxygen to produce hydrofluoric acid (HF), which is a corrosive gas. That is, hydrofluoric acid (HF) may be diffused together with the electrolyte vapor inside the first container. Thereby, the battery cell evaluation method according to the present embodiment can determine whether the pouch film is peeled in a hydrofluoric acid (HF) atmosphere together with an electrolytic solution atmosphere.

The second container may be stored in the chamber for 5 to 12 hours. More specifically, the second container may be stored in the chamber for 6 to 11 hours. As an example, the second container may be stored in the chamber for 7 to 10 hours.

Thereby, the second container can be stored in the chamber for the period described above, and thus, a chemical reaction or the like may sufficiently occur in the pouch film exposed to electrolyte vapor and hydrofluoric acid (HF), so that the accuracy of evaluation of the presence or absence of peeling of the pouch film can be improved. On the other hand, when the second container is stored in the chamber for less than 5 hours, a chemical reaction is hard to occur sufficiently between the pouch film and the electrolyte vapor and hydrofluoric acid (HF), which causes a problem that it is difficult to accurately perform the presence or absence of peeling of the pouch film.

Figure 4:
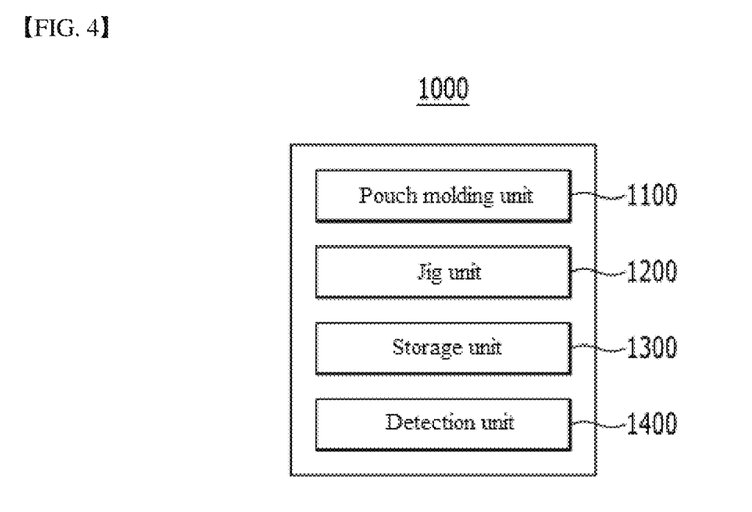
FIG. 4 is a schematic diagram showing the components of a battery cell evaluation device according to another embodiment of the present disclosure.

FIG. 4 is a schematic diagram showing the components of a battery cell evaluation device according to another embodiment of the present disclosure.

Referring to FIG. 4, the battery cell evaluation device 1000 according to the present embodiment may include a pouch molding unit 1100, a jig unit 1200, a storage unit 1300, and a detection unit 1400. However, the present disclosure is not limited thereto, and some of the above components may be omitted or other components may be added.

More specifically, the pouch molding unit 1100 may form a receiving part in the pouch film. The pouch molding unit 1100 may form the receiving part equal to or larger than the size of the electrode assembly of the battery cell. Particularly, the pouch molding unit 1100 may form the receiving part so that the maximum molding depth of the pouch film is the same. However, the present disclosure is not limited thereto, and the pouch molding unit 1100 may form a receiving part having a maximum molding depth or size suitable for detecting whether the outer layer of the battery cell is peeled.

Further, the jig unit 1200 may provide an impact to at least one of the corners of the receiving part in the pouch film formed with the receiving part to which the electrode assembly is mounted. The details of the jig unit 1200 will be described later with reference to FIG. 5.

Further, the storage unit 1300 may store the pouch film subjected to impact from the jig unit 1200 inside the second container together with the first container containing the electrolytic solution. More specifically, the storage unit 1300 further includes a chamber maintained under a high temperature and high humidity condition, and the second container may be stored in the chamber. In one example, the inside of the chamber may be maintained at a temperature of 40 degrees Celsius to 80 degrees Celsius. In another example, the inside of the chamber may be maintained at a humidity of 70% RH to 99% RH.

Further, the detection unit 1400 may determine whether the outer layer of the pouch film is peeled off. More specifically, the detection unit 1400 may determine the presence or absence of peeling of the outer layer of the pouch film with the naked eye, or may be detected through a detection means such as a microscope. However, the detection unit 1400 is not limited thereto, and any means for determining whether the outer layer of the pouch film is peeled may be included in the present embodiment.

Figure 5:
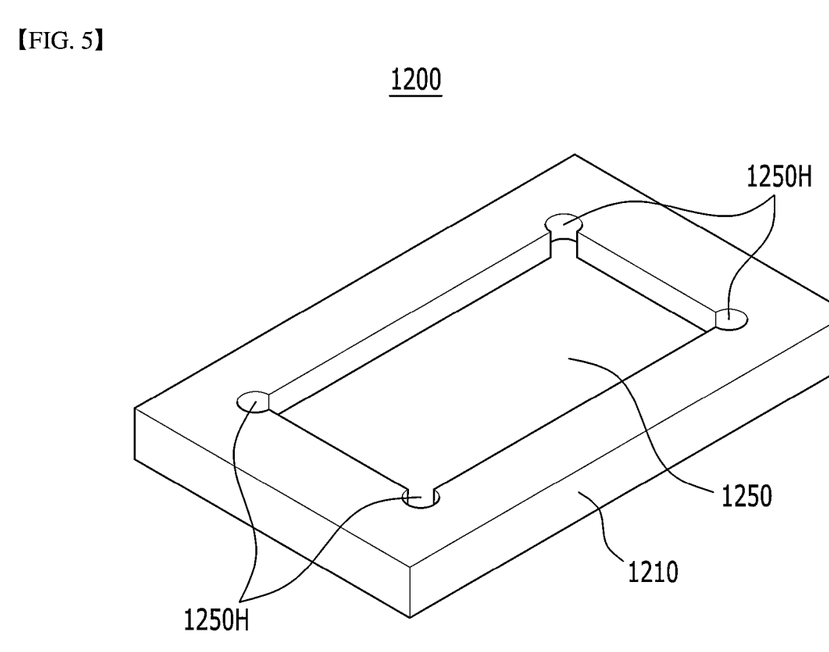
FIG. 5 is a diagram showing a jig unit included in the battery cell evaluation device of FIG. 4.

FIG. 5 is a diagram showing a jig unit included in the battery cell evaluation device of FIG. 4.

Referring to FIGS. 4 and 5, in the battery cell evaluation device 1000 according to the present embodiment, the jig unit 1200 may include a recessed part 1250 capable of housing the receiving part formed by the body part 1210 and the pouch molding unit 1100. Here, the recessed part 1250 may be recessed toward the bottom surface with reference to the outer surface of the body part 1210.

The recessed part 1250 may have a size equal to or larger than the receiving part. More specifically, the recessed part 1250 may have a size larger than that of the receiving part by 2 mm or more to 6 mm or less. In one example, the recessed part 1250 may have a size larger than that of the receiving part by 3 mm or more to 5 mm or less. However, the present disclosure is not limited thereto, and it may be included in the present embodiment if the recessed part 1250 of the jig unit 1200 is large enough to provide an impact to the receiving part.

Thereby, in the battery cell evaluation device 1000 of the present embodiment, the recessed part 1250 may provide uniform damage to each corner of the receiving part.

In addition, referring to FIG. 5, in the battery cell evaluation device 1000 according to the present embodiment, the jig unit 1200 may further include a notched part 1250H formed in the recessed part 1250. More specifically, in the jig unit 1200, the notched part 1250H may be formed at each corner of the recessed part 1250. In one example, the notched part 1250H may be formed in a circular shape. However, the shape of the notched part 1250H is not limited thereto, and it may be included in the present embodiment if each corner of the recessed part 1250 has a shape that does not provide damage to the receiving part.

Thereby, in the battery cell evaluation device 1000 of the present embodiment, in the process of mounting the receiving part to the recessed part 1250 of the jig unit 1200, it is possible to prevent the recessed part 1250 from providing damage to each corner of the receiving part by the user's handling.

Further, the jig unit 1200 may provide an impact to the receiving part at a speed of 40 mm/min to 60 mm/min and a force of 0.5N to 1.5N for a time period of 0.1 minutes to 1 minute.

Thereby, the battery cell evaluation device 1000 according to the present embodiment can simulate a situation in which the jig unit 1200 is provide an impact to the receiving part in advance, and the impact is provided to the corner of the receiving part in the degassing process, and can be improved in the accuracy of the evaluation of the presence or absence of peeling of the pouch film performed by the detection unit 1400.

Hereinafter, the contents of the present disclosure will be described by way of more specific examples, but the following examples are for illustrative purposes only, and the scope of the present invention is not limited thereto.

Example 1

With respect to the pouch film manufactured by DNP (Dai Nippon Printing Co., Ltd.), a pouch film in which a storage unit was formed was manufactured using an N93 forming tool. A jig unit recessed in a shape similar to the receiving part of the manufactured pouch film was mounted on the receiving part, and then an impact was provided to the corner of the receiving part via the jig part. At this time, the jig unit provided an impact to the corner of the receiving part at a speed of 50 mm/min and a force of 0.5N to 1.5N for 0.5 minutes.

Example 2

In Example 1, the pouch film is a pouch film manufactured by SHOWA. Except for this point, a pouch film having a receiving part was manufactured in the same manner as in Example 1, and an impact was provided to the corner of the receiving part.

Example 3

In Example 1, the pouch film was formed to have a molding depth of 4.5 mm for the receiving part. Except for this point, a pouch film having a receiving part was manufactured in the same manner as in Example 1, and an impact was provided to the corner of the receiving part.

Example 4

In Example 1, the pouch film was formed to have a molding depth of 5.0 mm for the receiving part. Except for this point, a pouch film having a receiving part was manufactured in the same manner as in Example 1, and an impact was provided to the corner of the receiving part.

Example 5

In Example 1, the pouch film is a pouch film manufactured by SHOWA, and the pouch film was formed to have a molding depth of 5.0 mm for the receiving part. Except for this point, a pouch film having a receiving part was manufactured in the same manner as in Example 1, and an impact was provided to the corner of the receiving part.

Example 6

In Example 1, the pouch film is a pouch film manufactured by SHOWA, and the pouch film was formed to have a molding depth of 5.5 mm for the receiving part. Except for this point, a pouch film having a receiving part was manufactured in the same manner as in Example 1, and an impact was provided to the corner of the receiving part.

Experimental Example 1—High Temperature and High Humidity Condition 5 pouch films manufactured in Example 1 and 5 pouch films manufactured in Example 2 were stored in a chamber maintained at 60 degrees and 90% RH, respectively, and then, the presence or absence of peeling of the outer layer of each pouch film was determined, and the results are shown in Table 1 below.

TABLE 1

| Sample | Example 1 | | | Example 2 | | |
|---|---|---|---|---|---|---|
| | 1-day | 3-day | 7-day | 1-day | 3-day | 7-day |
| 1 | ○ | ○ | ○ | ○ | ○ | ○ |
| 2 | ○ | ○ | ○ | ○ | ○ | ○ |
| 3 | ○ | ○ | ○ | ○ | ○ | ○ |
| 4 | ○ | ○ | ○ | ○ | ○ | ○ |
| 5 | ○ | ○ | ○ | ○ | ○ | ○ |

Figure 6:
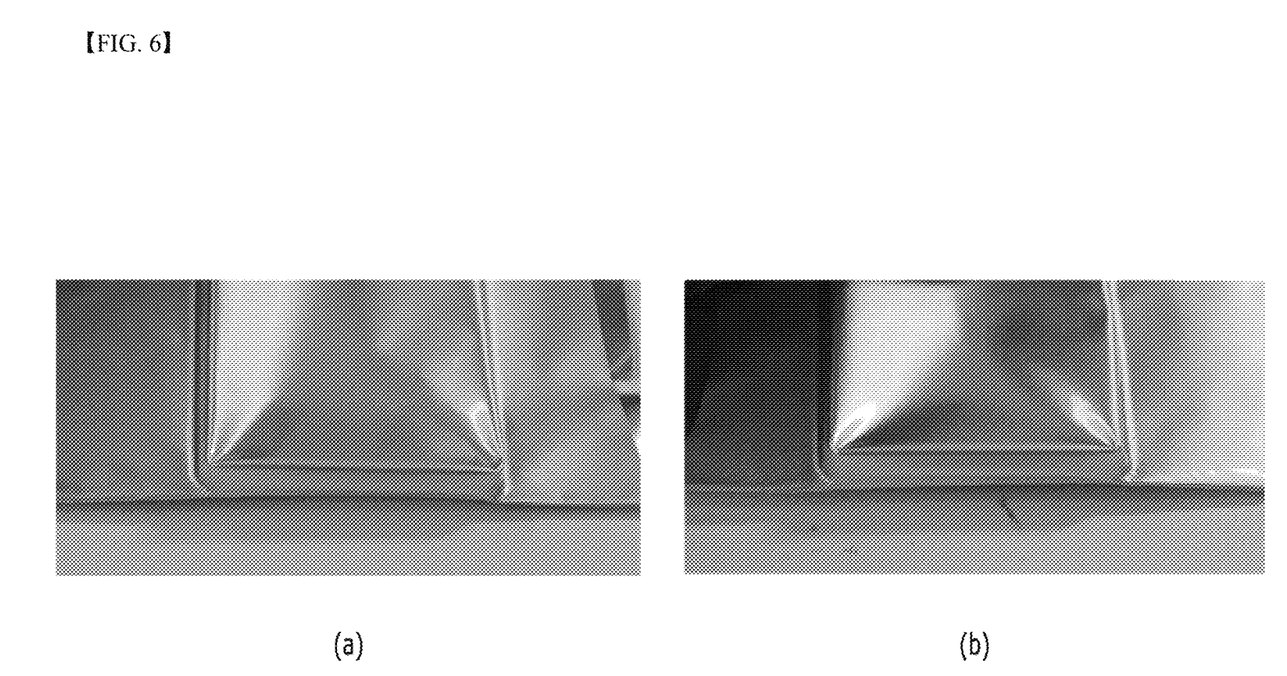
FIG. 6(a) is a figure showing the result of Example 1 according to Experimental Example 1.
FIG. 6(b) is a figure showing the results of Example 2 according to Experimental Example 1.

Referring to FIG. 6 and Table 1, when storing the pouch film under a high temperature and high humidity condition, it can be confirmed that another outer layer peeling phenomenon is not detected even after the time is passed over more or less. Thereby, when the pouch film is simply stored under a high temperature and high humidity condition as in Experimental Example 1, it can be confirmed that it is difficult to detect in advance the pouch film in which the outer layer peeling can be generated in the process of manufacturing the battery cell.

Experimental Example 2—Electrolytic Solution Atmosphere

Together with the first container containing the standard electrolytic solution (EC:EMC:DMC=3:3:4, $LiPF_6$ 1M, density 1.227 g/ml), 5 pouch films manufactured in Example 1 and 5 pouch films manufactured in Example 2 were housed in a second container, and then the second container was stored in a chamber maintained at 60 degrees and 90% RH in a closed state, respectively. Thereafter, the presence or absence of peeling of the outer layer of each pouch film was determined, and the results are shown in Table 2 below.

TABLE 2

| Sample | Example 1 | | | Example 2 | | |
|---|---|---|---|---|---|---|
| | 1 day | 7-day | 14-day | 1-day | 7-day | 14-day |
| 1 | ○ | NG | NG | ○ | ○ | NG |
| 2 | ○ | NG | NG | ○ | ○ | ○ |
| 3 | ○ | ○ | NG | ○ | ○ | ○ |

Figure 7:
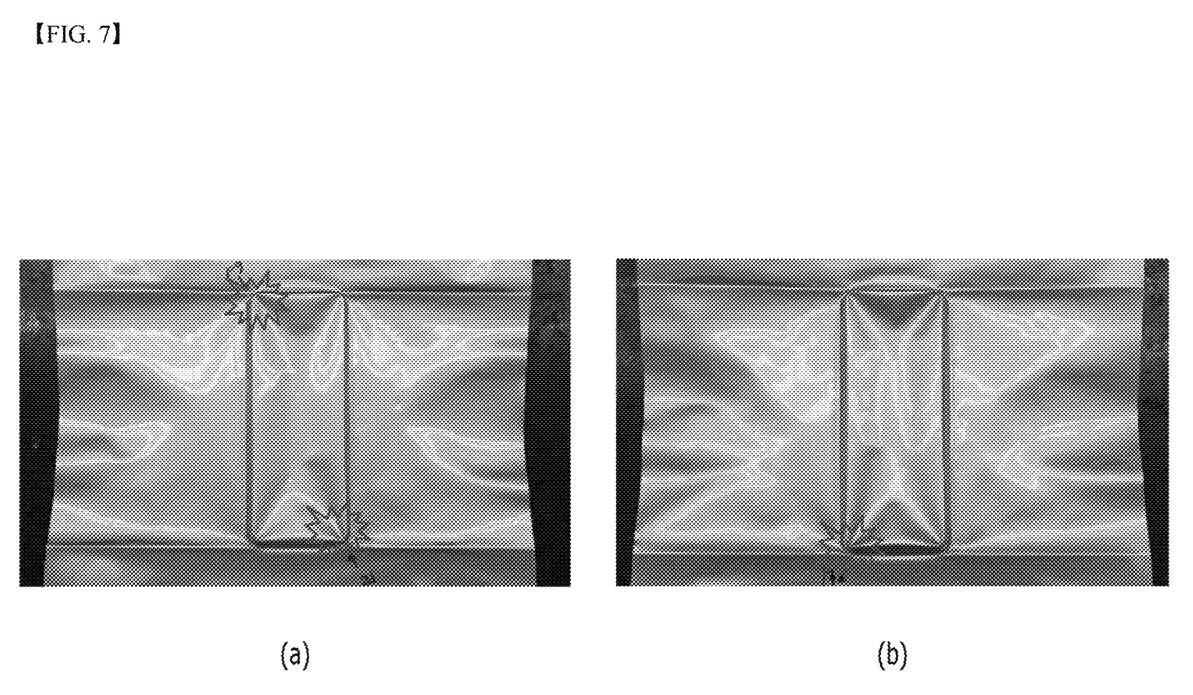
FIG. 7(a) is a figure showing the result of Example 1 according to Experimental Example 2.
FIG. 7(b) is a figure showing the result of Example 2 according to Experimental Example 2.

Referring to FIG. 7 and Table 2, when the pouch film is stored in an electrolytic solution atmosphere together with a high temperature and high humidity condition, it can be confirmed that after the lapse of 7 and/or 14 days, peeling of the outer layer was detected at the corner of some pouch films. Thereby, unlike Experimental Example 1, when the pouch film is simply stored in an electrolytic solution atmosphere together with a high temperature and high humidity condition, it can be confirmed that even in the case of pouch films from different manufacturers as in Examples 1 and 2, it is possible to detect in advance the presence or absence of peeling of the outer layer that can occur in the process of manufacturing the battery cell.

In addition, in the case of Example 1, it can be confirmed that peeling of the outer layer is detected from 7-day in some samples, but in the case of Example 2, it can be confirmed that peeling of the outer layer is detected from 14-day in some samples. Thereby, in the case of Example 1, it can be confirmed that the peeling of the outer layer is quickly detected in the electrolytic solution atmosphere. Therefore, with respect to the pouch films from different manufacturers as in Examples 1 and 2, it can be confirmed that the outer layer peeling of the pouch film of a certain manufacturer occurs relatively well in the process of manufacturing the battery cell.

Experimental Example 3—Electrolytic Solution and Hydrofluoric Acid (HF) Atmosphere Together with the first container containing 100 ml of standard electrolytic solution (EC:EMC:DMC=3:3:4, $LiPF_6$ 1M, density 1.227 g/ml) and 1000 ppm of $H_2O$, each of the 5 pouch films manufactured in Examples 3 to 6 was housed in a second container, and then the second container was stored in a chamber maintained at 60 degrees and 90% RH in a closed state, respectively. Thereafter, the presence or absence of peeling of the outer layer of each pouch film was determined, and the results are shown in Table 3 below.

TABLE 3

| | Pouch film | Molding Depth (mm) | 2-hour | 4-hour | 8-hour |
|---|---|---|---|---|---|
| Example 3 | Manufactured by DNP | 4.5 | O/5 | 0/5 | 5/5 |
| Example 4 | Manufactured by DNP | 5.0 | O/5 | 0/5 | 5/5 |

TABLE 3-continued

|  | Pouch film | Molding Depth (mm) | 2-hour | 4-hour | 8-hour |
|---|---|---|---|---|---|
| Example 5 | Manufactured by SHOWA | 5.0 | O/5 | 0/5 | 5/5 |
| Example 6 | Manufactured by SHOWA | 5.5 | O/5 | O/5 | 5/5 |

Figure 8:
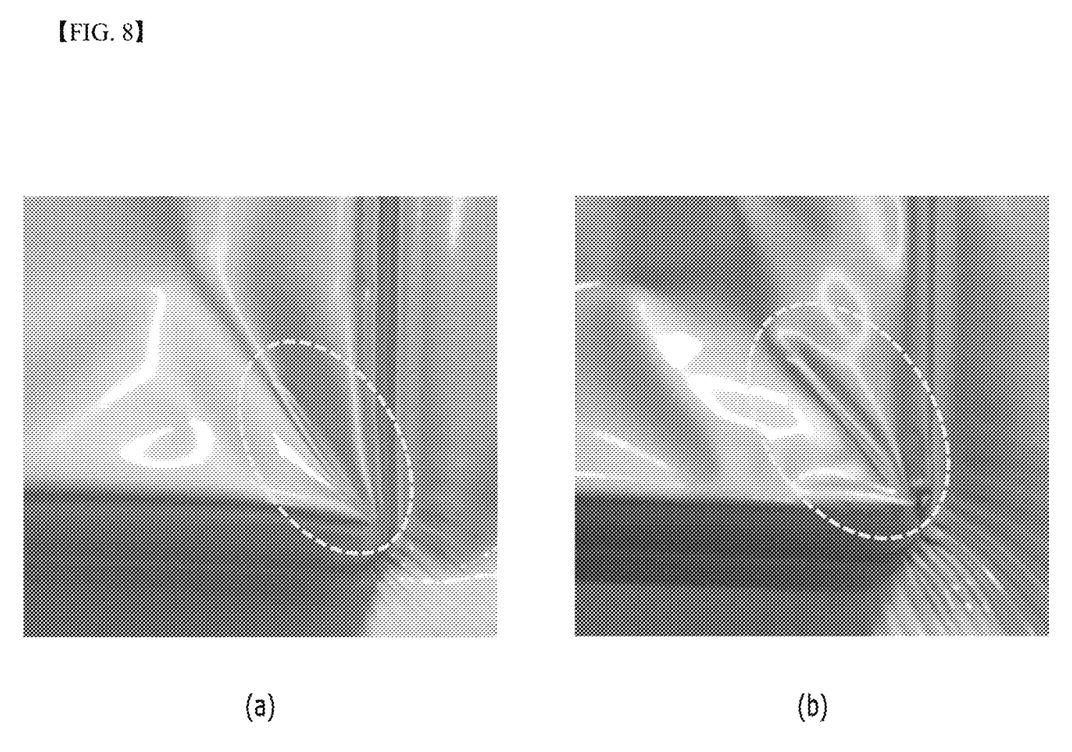
FIG. 8(a) is a figure showing the result of Example 4 according to Experimental Example 3.
FIG. 8(b) is a figure showing the results of Example 5 according to Experimental Example 3.

Referring to FIG. 8 and Table 3, when the pouch film is stored in an electrolytic solution and hydrofluoric acid (HF) atmosphere together with a high temperature and high humidity condition, it can be confirmed that after the lapse of 8 hours, peeling of the outer layer is detected in some corners of the pouch films of Examples 4 and 5 in which the molding depth of the receiving part is the same. Therefore, unlike Experimental Example 1, when the pouch film is simply stored in an electrolytic solution and hydrofluoric acid (HF) atmosphere together with a high temperature and high humidity condition, it can be confirmed that even in the case of pouch films from different manufacturers as in Examples 4 and 5, it is possible to quickly detect the presence or absence of peeling of the outer layer that can occur in the process of manufacturing the battery cell.

In addition, unlike Experimental Example 2 in which outer layer peeling is detected upon lapse of 7 days or more, it can be confirmed that when the pouch film is stored in a hydrofluoric acid (HF) atmosphere together with an electrolytic solution atmosphere, the pouch film in which the outer layer peeling can be generated can be detected more quickly in the process of manufacturing the battery cell.

Further, comparing Example 3 and Example 6, in the pouch film of Example 3, peeling of the outer layer was detected after the lapse of 8 hours at a relatively small molding depth (4.5 mm), and in the pouch film of Example 6, peeling of the outer layer was detected after the lapse of the same time at a relatively large molding depth (5.5 mm). Thereby, it can be confirmed that in the electrolytic solution and hydrofluoric acid (HF) atmosphere along with a high temperature and high humidity condition, the presence or absence of peeling of the outer layer is well detected even for pouch films of different manufacturers and molding depths as in Examples 3 and 6.

Although the invention has been shown and described above with reference to the preferred embodiments, the scope of the present disclosure is not limited thereto, and numerous other modifications and improvements can be devised by those skilled in the art using the basic principles of the invention described in the appended claims, which also falls under the spirit and scope of the present disclosure.

The invention claimed is:

1. A battery cell evaluation method comprising:
molding a pouch film to form a receiving part in which an electrode assembly is mounted;
providing an impact to at least one of the corners of the receiving part;
storing the pouch film inside a second container together with a first container configured to contain an electrolytic solution; and
detecting presence or absence of peeling of an outer layer of the pouch film.

2. The battery cell evaluation method according to claim 1, wherein the first container is opened toward the second container, and
the second container is sealed to be isolated from outside air.

3. The battery cell evaluation method according to claim 2, wherein at least a part of the electrolytic solution is configured to evaporate inside the second container.

4. The battery cell evaluation method according to claim 2, further comprising:
storing the second container in a chamber maintained under a high temperature and high humidity condition.

5. The battery cell evaluation method according to claim 4, further comprising: maintaining an inside of the chamber at a temperature of 40 to 80 degrees Celsius.

6. The battery cell evaluation method according to claim 4, further comprising:
maintaining the inside of the chamber at a humidity of 70% RH to 99% RH.

7. The battery cell evaluation method according to claim 4, further comprising:
storing the second container in the chamber for 1 to 28 days.

8. The battery cell evaluation method according to claim 1, further comprising:
mixing water together with the electrolytic solution in the first container.

9. The battery cell evaluation method according to claim 8, further comprising:
storing the second container in the chamber for 5 to 12 hours.

10. The battery cell evaluation method according to claim 1, wherein the providing the impact to the receiving part further comprises:
mounting a jig unit to the receiving part to provide the impact to the receiving part via the jig unit, wherein the jig unit is recessed in a shape similar to the receiving part.

11. The battery cell evaluation method according to claim 10, wherein the jig unit provides the impact to the receiving part at a speed of 40 mm/min to 60 mm/min and a force of 0.5 N to 1.5 N for a time period of 0.1 to 1 minute.

12. A battery cell evaluation device comprising:
a jig unit for providing an impact to at least one of corners of a receiving part, wherein the receiving part is formed from a pouch film and an electrode assembly is configured to be mounted to the receiving part;
a storage unit for storing the pouch film subjected to the impact from the jig unit in a second container together with a first container containing an electrolytic solution; and
a detection unit that determines presence or absence of peeling of an outer layer of the pouch film.

13. The battery cell evaluation device according to claim 12, wherein the jig unit comprises a body part and a recessed part that can house the receiving part, and
the recessed part is recessed toward a bottom surface with reference to an outer surface of the body part.

14. The battery cell evaluation device according to claim 13, wherein the recessed part has a size equal to or larger than that of the receiving part.

15. The battery cell evaluation device according to claim 13, wherein a notched part is formed at each corner of the recessed part.

16. The battery cell evaluation device according to claim 15, wherein the notched part is formed in a circular shape.

17. The battery cell evaluation device according to claim 12, wherein the jig unit provides the impact to the receiving part at a speed of 40 mm/min to 60 mm/min and a force of 0.5 N to 1.5 N for a time period of 0.1 to 1 minute.

18. The battery cell evaluation device according to claim 12, wherein the storage unit further comprises a chamber maintained under a high temperature and high humidity condition, and the second container is stored in the chamber.

19. The battery cell evaluation device according to claim 18, wherein an inside of the chamber is maintained at a temperature of 40 to 80 degrees Celsius.

20. The battery cell evaluation device according to claim 18, wherein an inside of the chamber is maintained at a humidity of 70% RH to 99% RH.

* * * * *